UNITED STATES PATENT OFFICE.

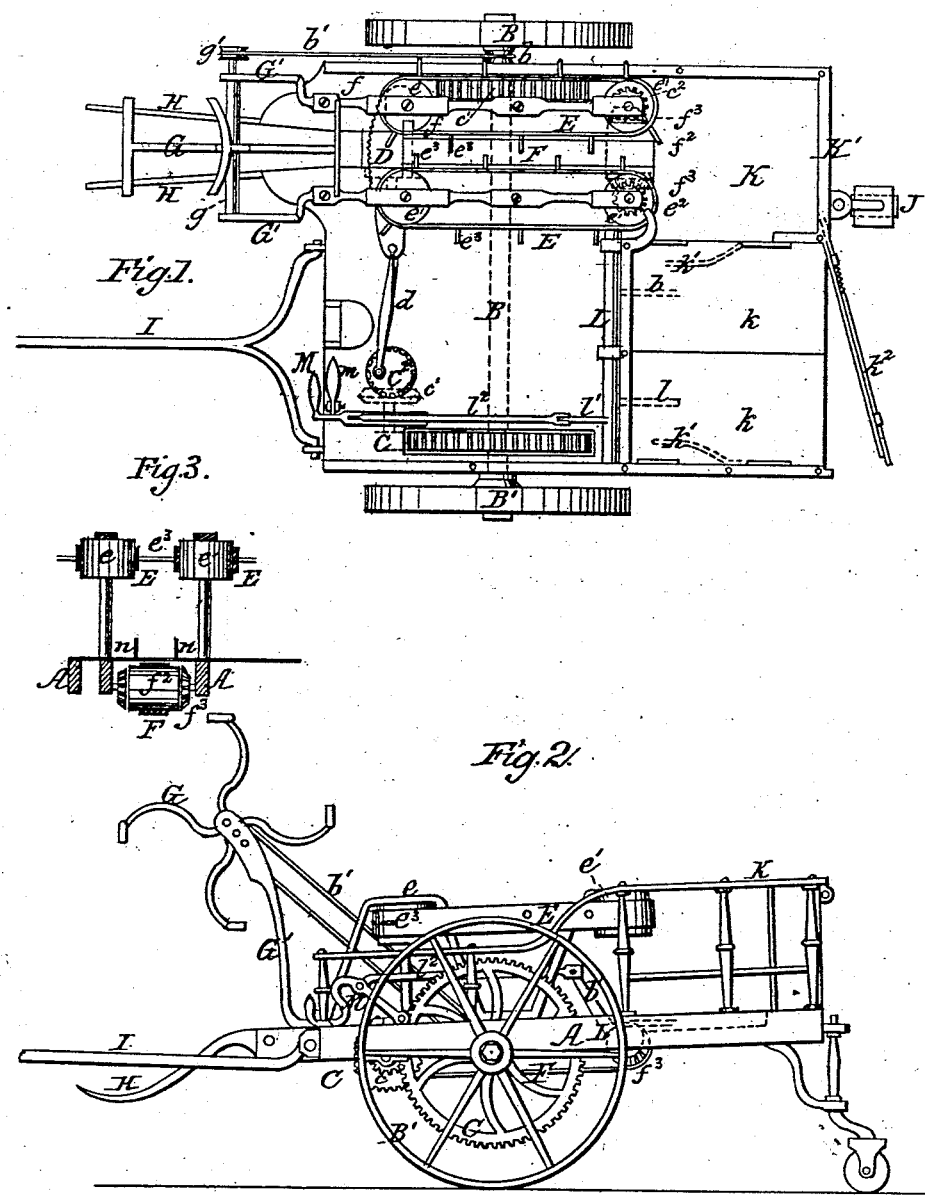

E. K. HARVEY, OF QUINCY, OHIO.

IMPROVEMENT IN CORN-HARVESTERS.

Specification forming part of Letters Patent No. 83,851, dated November 10, 1868.

*To all whom it may concern:*

Be it known that I, E. K. HARVEY, of Quincy, in the county of Logan, and in the State of Ohio, have invented new and useful Improvements in Corn-Harvesters; and I do hereby declare that the following is a full, clear, and exact description thereof, reference being had to the accompanying drawings, and to the letters of reference marked thereon, which make part of this specification, and in which—

Figure 1 represents a plan or top view of my improved corn-harvester, and Fig. 2 a side view of the same. Fig. 3 is a transverse section of the belts which convey the cut stalks to the rear platform of the machine.

The object of my invention is to produce a suitable harvester for cutting corn or cane; and to this end my improvements consist in providing a reel for pressing down the stalks upon the saw, which cuts them, together with conveyer-belts for carrying the cut stalks to the rear platform of the machine, all the mechanism being operated by gearing upon the driving-axle.

In the accompanying drawings, which show a convenient arrangement of parts for carrying out the objects of my invention, A represents a strong frame, on which the machine is mounted, and which is supported by two driving-wheels, B′, and a caster-wheel, J, the latter being pivoted to the rear of the machine. The driving-wheels B′ are secured upon an axle, B, which, likewise, has upon it the gears C C′. The gear C engages a pinion, $c$, upon a horizontal counter-shaft, to the opposite end of which is fastened a bevel-wheel, $c^1$, which gears with a pinion, $c^2$, to which a pitman, $d$, is fastened. The pitman $d$ is connected, at its opposite end, to the saw D, and vibrates the same for the purpose of cutting the stalks.

A reel, G, is mounted in bearings in the posts G′, and is rotated by a belt, $b′$, passing over the pulley $b$ on the driving-axle, and pulley $g′$ on the reel-shaft, for the purpose of pressing down the stalks to the saw, the stalks being properly directed thereto and supported by the gathering-horns H, which are attached to the frame immediately beneath the reel, and inclined in such a manner as to direct the stalks toward the saw D.

The gear C′ engages a pinion, $f^1$, upon a counter-shaft, which carries a pulley, $f$. The belt F passes round the pulley $f$, and drives another counter-shaft by means of the pulley $f^2$. Bevel-gears $f^3$ are secured upon the shaft of the pulley $f^2$, which drive corresponding pinions $e^2$ upon vertical shafts, which carry the pulleys $e^1$.

Conveyer-belts E, provided with spikes or prongs $e^3$ on their outer surfaces, pass around the pulleys $e^1$ and similar pulleys $e$ in the rear of the reel, for the purpose of carrying the cut stalks to the rear platform, K, the butts of the cut stalks resting on the belt F, which has the same rate of speed toward the rear of the machine as the belts E E, the guides $n$ $n$ on each side of the belt serving to retain the butts of the stalks on the belt.

By this arrangement of the belts E E and F and the guides $n$ $n$ the cut stalks are carried back to the platform K in a standing position, which would not be the case if the belt F did not move in harmony with the belts E E, or if the butts of the stalks rested on a stationary surface.

From an inspection of the arrangement of the gearing it will be seen that when the machine is drawn forward the inner sides of the conveyer-belts E E and F travel rearward, so as to carry back the stalks which rest upon and between them and upon the prongs $e^3$.

The rear platform, K, is provided with hinged horizontal doors $k$, which are supported by arms $l$ on a horizontal shaft, L, resting in bearings in the frame, and are thrown back, when lowered, by springs $k^1$ beneath them. The doors can be dropped by raising the lever M, pivoted to the frame and to a bar or rod, $l′$, which is pivoted to an arm, $l^1$, on the shaft L. The platform is surrounded by a rail, K′, provided with a gate, $k^2$. The lever M is held in position when the doors are closed by the stop $m$. I represents the tongue.

The operation of the machine is as follows: The harvester being drawn by horses attached to the tongue I, the revolutions of the driving-axle B give motion to the reel G, conveyer-belts E and F, and saw D. The horns H guide the stalks to the reel G, by which they are pressed down in proper position to be cut by the saw D, and, falling upon the prongs $e^3$, with their butts on the belt F, are carried to the rear platform, K, where they are retained in an upright position by the railing K' until there is a sufficient quantity gathered to form a shock, when the machine is halted, and the shock bound while resting on the trap-doors k k, after which it is dropped onto the ground by lowering the trap-doors, and the gate k² being opened, when the machine moves forward the shock is left standing on the ground in an upright position.

Having described my improved corn-harvester, what I claim therein as new, and desire to secure by Letters Patent, is—

The belt F, guides n n, belts E E, and saw D, combined, arranged, and operating as set forth.

In testimony that I claim the above-described improvements in corn-harvesters I have hereunto signed my name this 4th day of May, 1868.

E. K. HARVEY.

Witnesses:
 A. J. BERRY,
 T. H. BELL.